(12) United States Patent
Wu

(10) Patent No.: US 10,725,344 B1
(45) Date of Patent: Jul. 28, 2020

(54) DISPLAY PANEL AND DISPLAY DEVICE

(71) Applicant: Xiamen Tianma Micro-Electronics Co., Ltd, Xiamen (CN)

(72) Inventor: Hao Wu, Xiamen (CN)

(73) Assignee: Xiamen Tianma Micro-Electronics Co., Ltd, Xiamen (CN)

( * ) Notice: Subject to any disclaimer, the term of this patent is extended or adjusted under 35 U.S.C. 154(b) by 0 days.

(21) Appl. No.: 16/592,652

(22) Filed: Oct. 3, 2019

(30) Foreign Application Priority Data

Apr. 25, 2019 (CN) .......................... 2019 1 0338587

(51) Int. Cl.
*G02F 1/1339* (2006.01)
*G02F 1/1333* (2006.01)
*G02F 1/1343* (2006.01)
*G06F 3/044* (2006.01)

(52) U.S. Cl.
CPC ........ *G02F 1/1339* (2013.01); *G02F 1/13338* (2013.01); *G02F 1/134336* (2013.01); *G02F 2001/133357* (2013.01); *G02F 2201/121* (2013.01); *G06F 3/0446* (2019.05); *G06F 2203/04112* (2013.01)

(58) Field of Classification Search
CPC ... G02F 2001/133388; G02F 1/134336; G02F 1/136286; G02F 1/1368; G02F 2001/136295; G06F 3/0446; G09G 3/3648; G09G 2300/0426; G09G 2300/0421; G09G 2310/0281
See application file for complete search history.

(56) References Cited

U.S. PATENT DOCUMENTS

| | | | | |
|---|---|---|---|---|
| 10,629,634 | B1* | 4/2020 | Liao | G02F 1/1362 |
| 2015/0253610 | A1* | 9/2015 | Sung | G02F 1/1339 |
| | | | | 349/150 |
| 2018/0120604 | A1 | 5/2018 | Seok et al. | |
| 2018/0240816 | A1* | 8/2018 | Xian | H01L 27/124 |

FOREIGN PATENT DOCUMENTS

CN 108008581 A 5/2018

* cited by examiner

*Primary Examiner* — Michael H Caley
*Assistant Examiner* — Mariam Qureshi
(74) *Attorney, Agent, or Firm* — Christensen O'Connor Johnson Kindness PLLC

(57) ABSTRACT

Provided is a display panel including a first substrate and a second substrate that are opposite to the first substrate and a sealant arranged in the non-display area. The first substrate includes a base substrate, first fanout wires and a planarization layer that are arranged at a side of the base substrate proximate to the second substrate. The first fanout wires are arranged in the non-display area and at a side of the planarization layer facing away from the base substrate. Each first fanout wire includes first to third wires that are connected in sequence. A distance between adjacent second wires is greater than a distance between adjacent first wires, and is greater than a distance between adjacent third wires. The planarization layer is provided with a first opening, and the first opening overlaps with the sealant and a second wire area formed by second wires.

18 Claims, 10 Drawing Sheets

DISPLAY PANEL AND DISPLAY DEVICE

CROSS-REFERENCE TO RELATED APPLICATIONS

The present application claims priority to Chinese Patent Application No. 201910338587.X, filed on Apr. 25, 2019, the content of which is incorporated herein by reference in its entirety.

TECHNICAL FIELD

The present disclosure relates to the field of display technologies, and particularly, to a display panel and a display device including the display panel.

BACKGROUND

With the development of the display market, consumers have higher requirement on visual effects, including not only various kinds of appearance of a display screen, but also a higher screen-to-body ratio. As a result, the full-screen technologies have been developed and the developing trend is to design a display device with an ultra-narrow bezel or even with no bezel, in order to obtain a screen-to-body ratio equal to or greater than 90%. Such design maximizes a display area without changing a total area of a display device, thereby providing improved visual effects.

However, the narrower a bezel of the display screen is, the worse the sealing property of the display screen will be. Thus, the display screen has a worse performance in preventing moisture from permeating into it. When performing reliability test on such display screen, the moisture might permeate into the display screen easily, causing wires inside the display screen to be exposed into the moisture and thus corroded, thereby resulting in defects.

SUMMARY

The present disclosure provides a display panel and a display device.

In a first aspect of the present disclosure, a display panel is provided. The display panel has a display area and a non-display area surrounding the display area. The display panel includes a first substrate and a second substrate that are opposite to each other. The first substrate includes a base substrate, a plurality of first fanout wires and a planarization layer. The plurality of first fanout wires and the planarization layer are arranged at a side of the base substrate close (proximate) to the second substrate, and the plurality of first fanout wires is arranged in the non-display area and at a side of the planarization layer facing away from the base substrate. The display panel further includes a sealant arranged in the non-display area. The first substrate and the second substrate are attached together through the sealant, and in a direction perpendicular to a light-exiting surface of the display panel the sealant overlaps with the plurality of first fanout wire. The plurality of first fanout wires includes a plurality of first wires, a plurality of second wires and a plurality of third wires, and one of the plurality of first wires, one of the plurality of second wires and one of the plurality of third wires are connected in sequence to form at least a part of one of the plurality of first fanout wires. Each of the plurality of first wires extends along a first direction, each of the plurality of second wires extends along a second direction, each of the plurality of third wires extends along a third direction, the first direction intersects with the second direction, and the second direction intersects with the third direction. The plurality of first wires is arranged in sequence to form a first wire area, the plurality of second wires is arranged in sequence to form a second wire area, the plurality of third wires are arranged in sequence to form a third wire area, and the second wire area is located between the first wire area and the third wire area. A distance between adjacent second wires of the plurality of second wires is greater than a distance between adjacent first wires of the plurality of first wires, and is greater than a distance between adjacent third wires of the plurality of third wires. The planarization layer is provided with a first opening, and in the direction perpendicular to the light-exiting surface of the display panel, the first opening overlaps with each of the sealant and the second wire area.

In a second aspect, a display device is provided. The display device includes the display panel as mentioned in the first aspect.

BRIEF DESCRIPTION OF DRAWINGS

In order to illustrate technical solutions of embodiments of the present disclosure, the accompanying drawings used in the embodiments are introduced hereinafter. Obviously, these drawings illustrate some embodiments of the present disclosure. On the basis of these drawings, those skilled in the art can also obtain other drawings.

DESCRIPTION OF EMBODIMENTS

Figure 1:
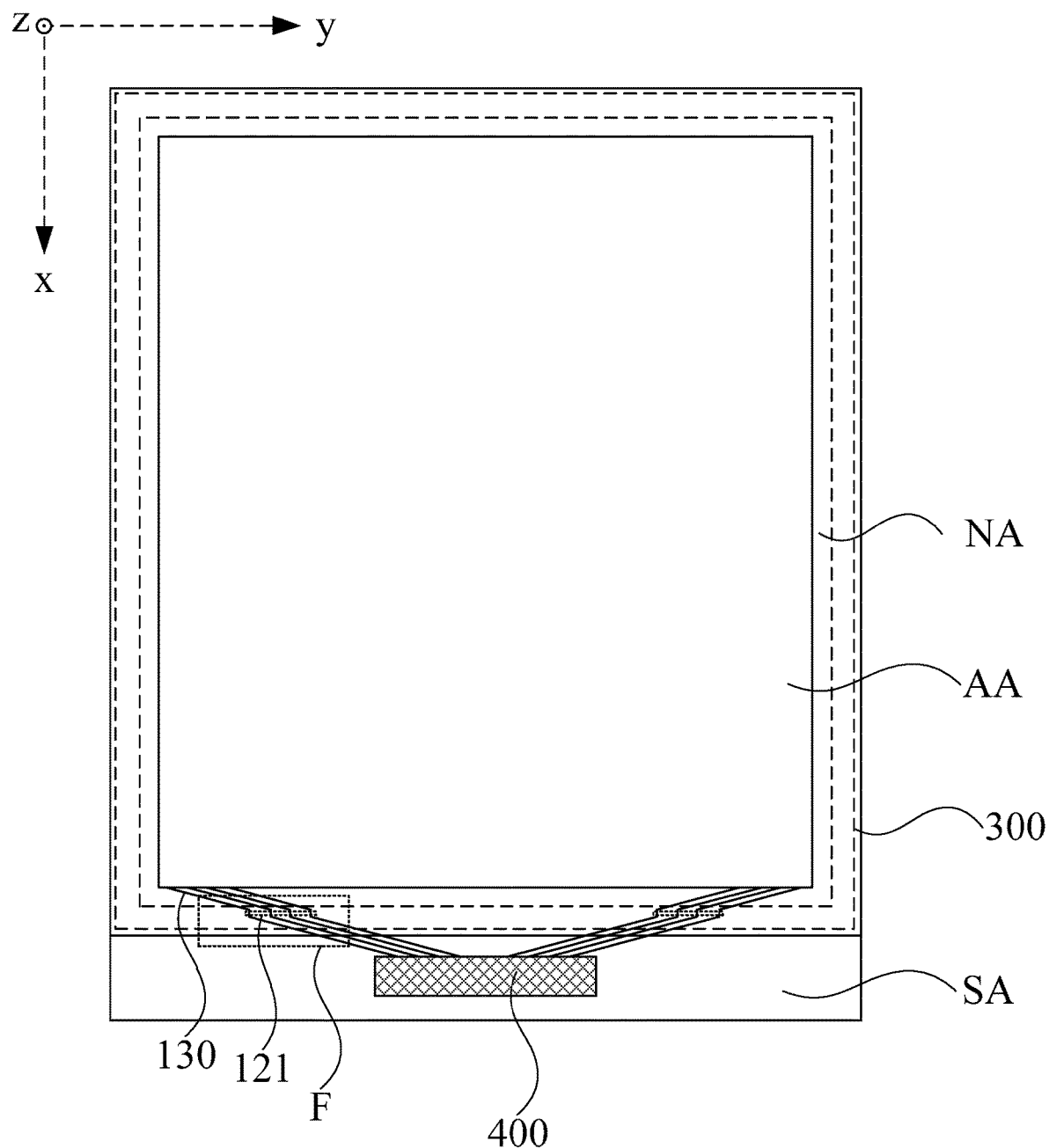
FIG. 1 is a top view of a display panel according to some embodiments of the present disclosure.

In order to better understand technical solutions of the present disclosure, the embodiments of the present disclosure are described in detail with reference to the drawings.

It should be clear that the described embodiments are merely part of the embodiments of the present disclosure rather than all of the embodiments. All other embodiments obtained by those skilled in the art shall fall into the protection scope of the present disclosure.

The terms used in the embodiments of the present disclosure are merely for the purpose of describing specific embodiments, rather than limiting the present disclosure. The terms "a", "an", "the" and "said" in a singular form in the embodiments of the present disclosure and the attached claims are also intended to include plural forms thereof, unless noted otherwise.

It should be understood that the term "and/or" used in the context of the present disclosure is to describe a correlation relation of related objects, indicating that there may be three relations, e.g., A and/or B may indicate only A, both A and B, and only B. In addition, the symbol "/" in the context generally indicates that the relation between the objects in front and at the back of "/" is an "or" relationship.

It should be understood that although the terms 'first' and 'second' may be used in the present disclosure to describe devices, the devices should not be limited to these terms. These terms are used only to distinguish the devices from each other. For example, without departing from the scope of the embodiments of the present disclosure, a first device may also be referred to as a second device. Similarly, the second device may also be referred to as the first device.

As mentioned in the background, the display screen has a narrower bezel, which affects its sealing property (e.g., its sealing quality at a side of a step area of the display screen). The step area is typically provided with a driving chip. For a display screen having a wide bezel, an adhesive sealant is typically applied between the driving chip and a display area, in order to efficiently prevent moisture from permeating into the display screen. With the bezel being narrower and narrower, a distance between the driving chip and the display area becomes shorter, leaving an area uncovered by the adhesive sealant technically, which would result in a bad performance of the display screen in preventing moisture from entering an interior of the display panel and thus cause some metal wires to be corroded, thereby resulting in bad display of the display panel.

Some embodiments of the present disclosure provide a display panel. The display panel has a display area and a non-display area surrounding the display area. The display panel includes a first substrate and a second substrate that are opposite to each other. The first substrate includes a base substrate, first fanout wires and a planarization layer. The first fanout wires and the planarization layer are arranged at a side of the base substrate close (proximate) to the second substrate, and the first fanout wires are arranged in the non-display area and at a side of the planarization layer facing away from the base substrate. The display panel further includes a sealant arranged in the non-display area. The first substrate and the second substrate are attached together through the sealant, and in a direction perpendicular to a light-exiting surface of the display panel, the sealant overlaps with the plurality of first fanout wires. Each of the first fanout wires includes a first wire, a second wire connected to the first wire and a third wire connected to the second wire. The first wire extends along a first direction, the second wire extends along a second direction, and the third wire extends along a third direction. The first direction intersects with the second direction, and the second direction intersects with the third direction. The first wires are arranged in sequence to form a first wire area, the second wires are arranged in sequence to form a second wire area, and the third wires are arranged in sequence to form a third wire area. The second wire area is located between the first wire area and the third wire area. A distance between adjacent second wires is greater than a distance between adjacent first wires, and is greater than a distance between adjacent third wires. The planarization layer is provided with a first opening, and in the direction perpendicular to the light-exiting surface of the display panel, the first opening overlaps with both the sealant and the second wire area.

Figure 2:
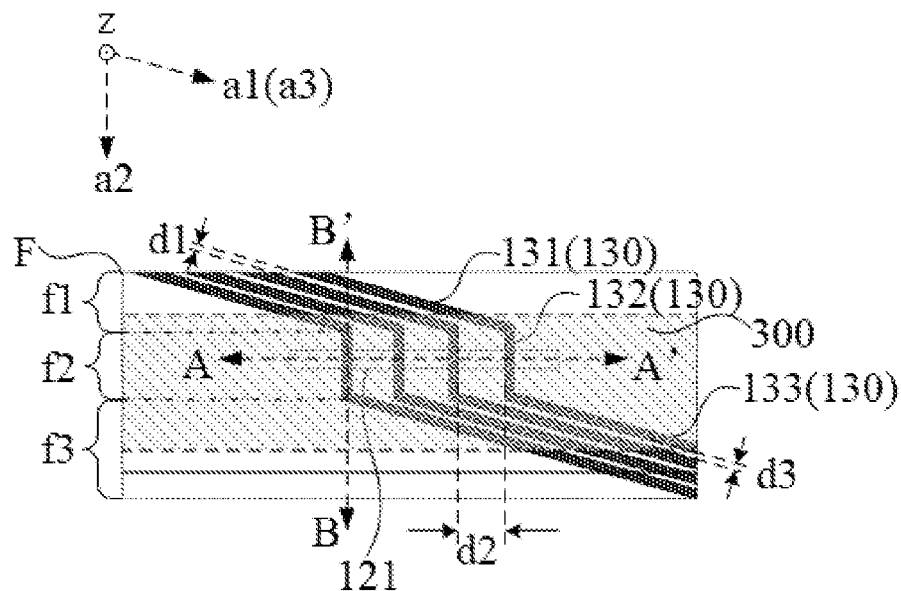
FIG. 2 is an enlarged view of an area in a dotted box F of the display panel in FIG. 1.
Figure 3:
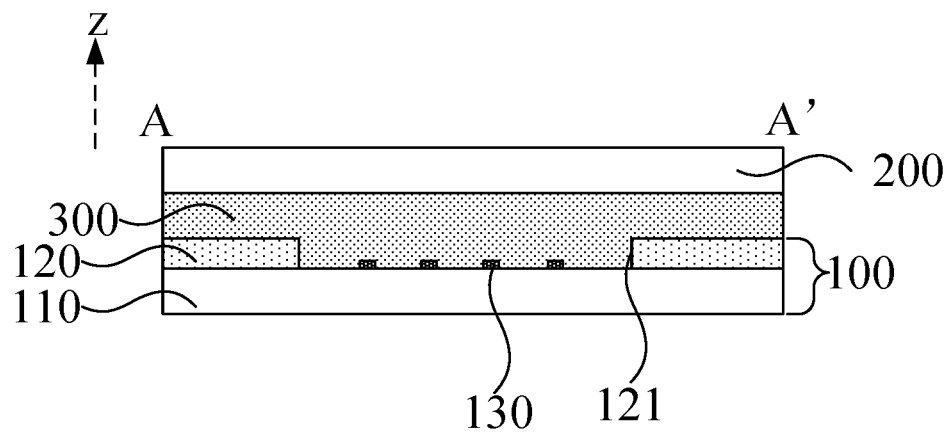
FIG. 3 is a sectional view of the display panel taken along line AA' in FIG. 2.
Figure 4:
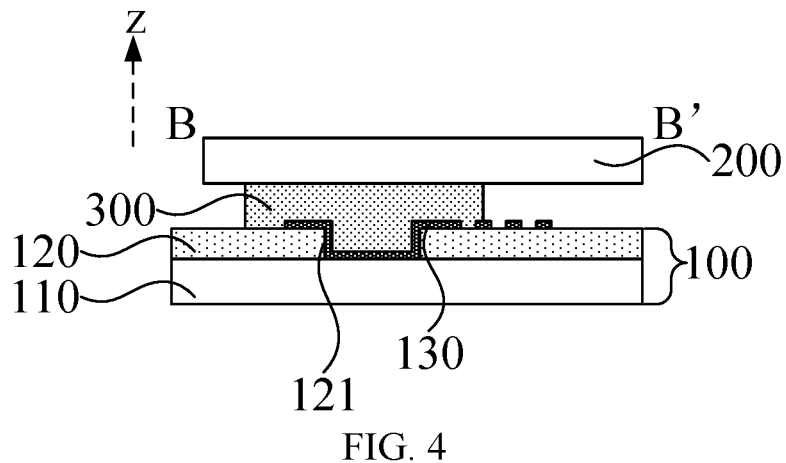
FIG. 4 is a sectional view of the display panel taken along line BB' in FIG. 2.
Figure 5:
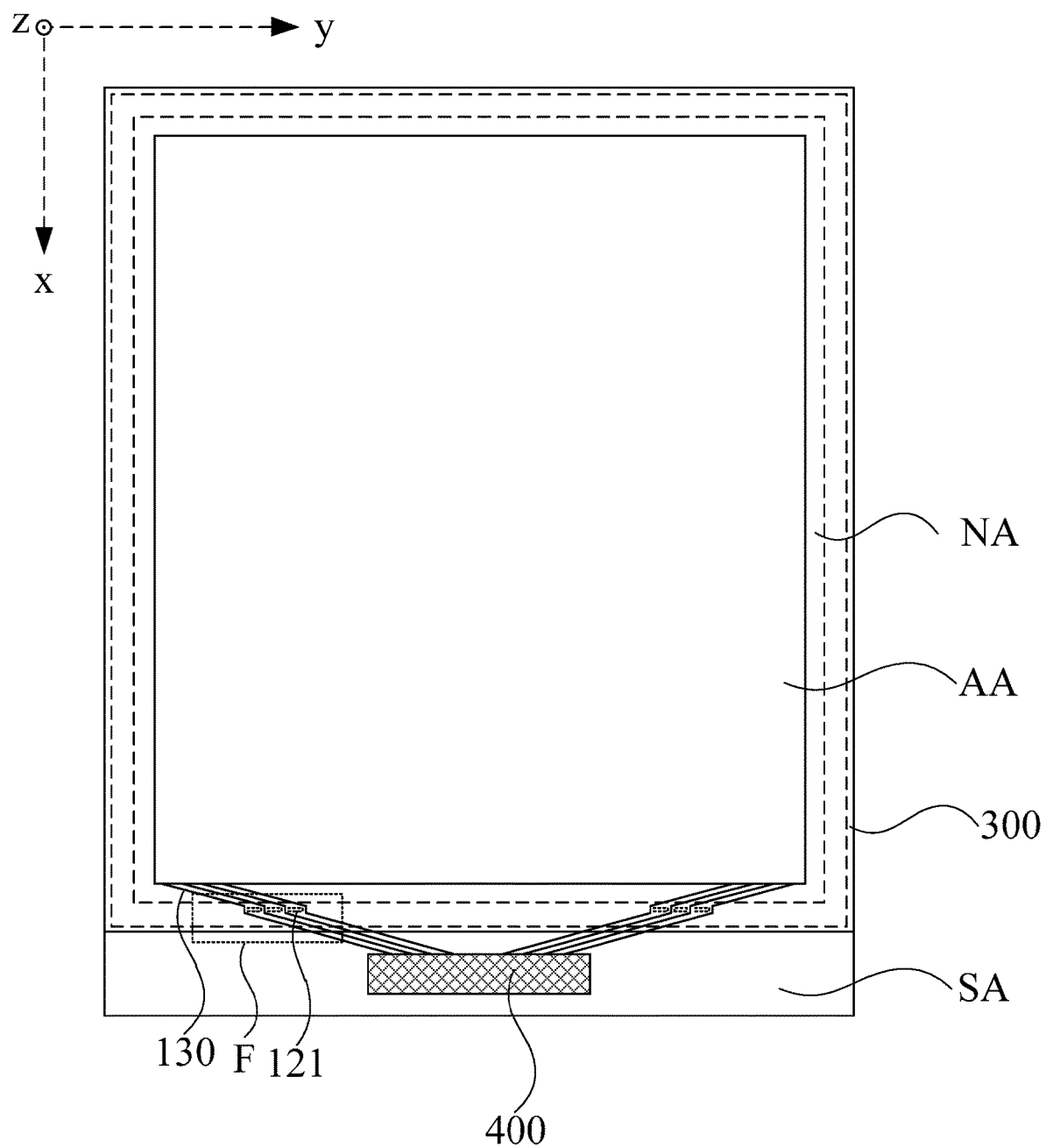
FIG. 5 is a top view of another display panel according to some embodiments of the present disclosure.

Referring to FIGS. 1-4, FIG. 1 is a top view of a display panel according to some embodiments of the present disclosure; FIG. 2 is an enlarged view of an area in a dotted box of the display panel in FIG. 1; FIG. 3 is a sectional view of the display panel taken along line AA' in FIG. 2; and FIG. 4 is a sectional view of the display panel taken along line BB' in FIG. 2. FIGS. 1-4 only illustrate a part of a structure of the display panel. The display panel has a display area AA and a non-display area NA surrounding the display area AA. The display panel includes a first substrate 100 and a second substrate 200 that are opposite to each other. The first substrate 100 includes a base substrate 110, first fanout wires 130 and a planarization layer 120. The first fanout wires 130 and the planarization layer 120 are arranged at a side of the base substrate 110 close to the second substrate 200, and the first fanout wires 130 are arranged in the non-display area NA and at a side of the planarization layer 120 facing away from the base substrate 110. The display panel further includes a sealant 300 arranged in the non-display area NA. The first substrate 100 and the second substrate 200 are attached together through the sealant 300, and in a direction z perpendicular to a light-exiting surface of the display panel, the sealant 300 overlaps with the first fanout wires 130. Each first fanout wire 130 includes a first wire 131, a second wire 132 connected to the first wire 131 and a third wire 133 connected to the second wire 132. The first wire 131 extends along a first direction a1, the second wire 132 extends along a second direction a2, and the third wire 133 extends along a third direction a3. The first direction a1 intersects with the second direction a2, and the second direction a2 intersects with the third direction a3. The first wires 131 are arranged in sequence to form a first wire area f1, the second wires 132 are arranged in sequence to form a second wire area f2, and the third wires 133 are arranged in sequence to form a third wire area f3. The second wire area f2 is located between the first wire area f1 and the third wire area f3. A distance d2 between adjacent second wires 132 is greater than a distance d1 between adjacent first wires 131, and is also greater than a distance d3 between adjacent third wires 133. The planarization layer 120 is provided with a first opening 121, and in the direction z perpendicular to the light-exiting surface of the display panel, the first opening 121 overlaps with both the sealant 300 and the second wire area f2.

In some embodiments, as shown in FIG. 1, the non-display area NA of the display panel further includes a step area SA, and the first fanout wires extend to the step area SA and are connected to the driving chip 400. In the related art, fanout wires of a display panel are typically arranged densely. Compared with such configuration in the related art, in the display panel provided by embodiments of present disclosure, a first fanout wire 130 overlapping with the sealant 300 and arranged at a side of the planarization 200 of the first substrate 100 facing away from the base substrate 110 is provided as a polyline, thereby forming a sparse wire area, i.e., the second wire area f2, between dense fanout wires. Moreover, the first opening 121 is provided in the planarization layer 120 of the area by digging out a part of the planarization layer 120, so that the sealant 300 for attaching the first substrate 100 with the second substrate 200 can be embedded into the first opening 121, and a region in which the first fanout wire 130 overlaps with the first opening 121 is no longer in contact with the planarization layer 120. The planarization layer 120 is typically made of an organic material having high moisture absorption. In this way, even if the planarization layer 120 absorbs certain moisture, the second wire area is insulated from the moisture such that the first fanout wires in the second wire area f2 are prevented from being corroded by the moisture, thereby avoiding defects of the sealant 300 in direct contact with the first fanout wires 130. This can also prevent moisture from permeating into the display panel, which would otherwise corrode other wires, thereby improving visual effects of the display panel. In some embodiments, in the step area SA, a part of an area between the driving chip 400 and the display area AA is not coated with an adhesive sealant, which can shorten a distance between the driving chip 400 and the display area AA and achieving a display device with a narrow bezel. The adhesive sealant here is not the sealant 300. The sealant 300 is configured to attach the first substrate 100 with the second substrate 200 to form a liquid crystal cell, while the adhesive sealant is typically applied to a part of the step area between the driving chip and the display area so as to efficiently prevent moisture from permeating into the display panel.

In some embodiments, the first direction a1 is parallel with the third direction a3, that is, an extending direction of the first wire 131 is the same as an extending direction of the third wire 133, which facilitates manufacturing of the display panel.

In some embodiments, the first opening 121 is of a strip-shaped structure, and in the direction z perpendicular to the light-exiting surface of the display panel, the strip-shaped structure overlaps with multiple second wires 132, so that an extending length of the first opening 121 can be increased, thereby improving its performance in preventing the moisture from permeating into the display panel. In some embodiments, an extending direction of the first opening 121 is parallel with a direction in which the second wires 132 are arranged, which can increase the extending length of the first opening 121, thereby improving its performance in blocking the moisture.

Figure 6:
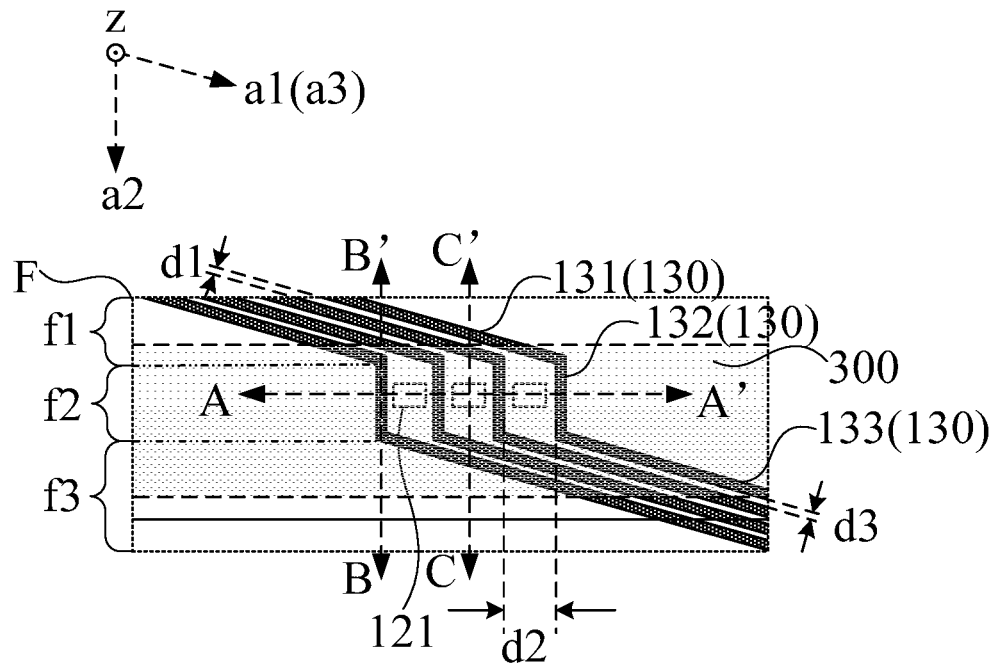
FIG. 6 is an enlarged view of an area in a dotted box F of the display panel in FIG. 5.
Figure 7:
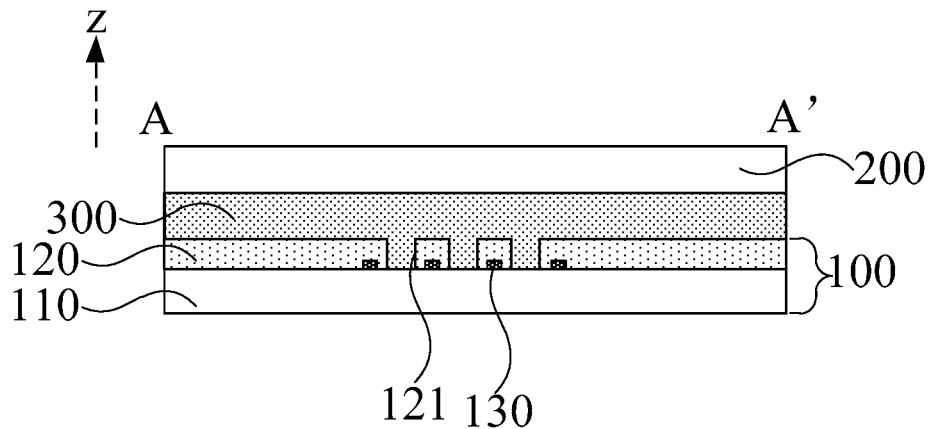
FIG. 7 is a sectional view of the display panel taken along line AA' in FIG. 6.
Figure 8:
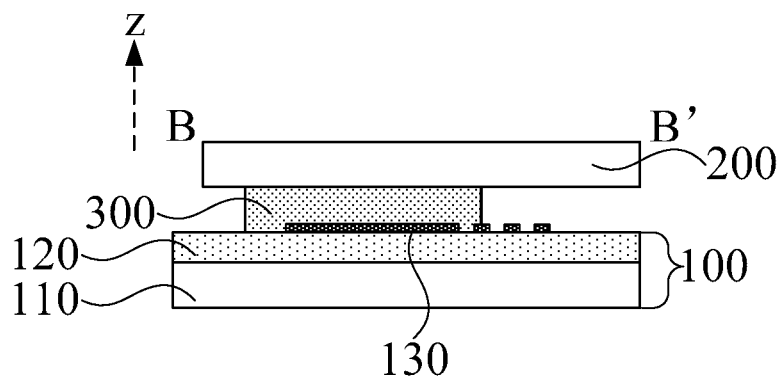
FIG. 8 is a sectional view of the display panel taken along line BB' in FIG. 6.
Figure 9:
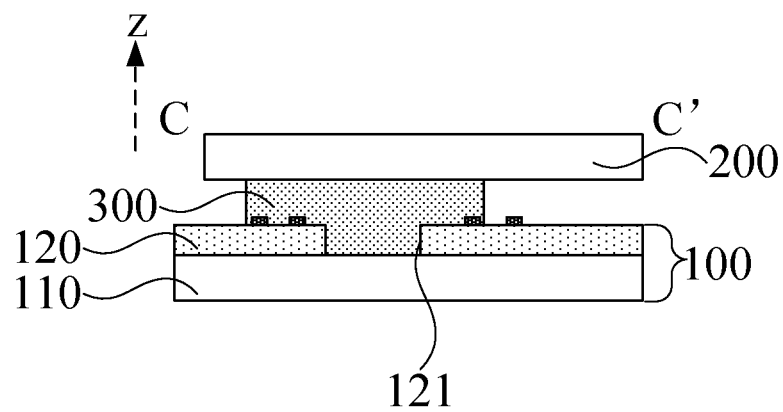
FIG. 9 is a sectional view of the display panel taken along line CC' in FIG. 6.

Referring to FIGS. 5-9, FIG. 5 is a top view of another display panel according to some embodiments of the present disclosure; FIG. 6 is an enlarged view of an area in a dotted box of the display panel in FIG. 5; FIG. 7 is a sectional view of the display panel taken along line AA' in FIG. 6; FIG. 8 is a sectional view of the display panel taken along line BB' in FIG. 6; and FIG. 9 is a sectional view of the display panel taken along line CC' in FIG. 6. In the following embodiments, same structures with FIGS. 1-4 are not repeated here and differences from FIGS. 1-4 lie in that the first opening 121 is of a block-shaped structure and in the direction z perpendicular to the light-exiting surface of the display panel, the first opening 121 does not overlap with the first fanout wires 130. Since the planarization layer 120 is relatively thick, there is a greater height difference between a bottom of the first opening 121 and a surface of the planarization layer 120 facing away from the base substrate110. If the first opening 121 overlaps with the first fanout wires 130, that is, some of the first fanout wires 130 are arranged in the first opening 121, and some of the first fanout wires 130 climb up the planarization layer 120 at a boundary of the first opening 121, which makes some of the first fanout wires 130 susceptible to easy breakage. This may result in an open circuit and thus affect normal operation of the display panel. In the present embodiment, the first opening 121 does not overlap with the first fanout wires 130, which can prevent the first fanout wires 130 from climbing up the planarization layer 120, which otherwise may result in an open circuit. Thus, the reliability of the display panel is increased.

In some embodiments, one first opening 121 is arranged between every two adjacent second wires 132. Since the first opening 121 does not overlap with the first fanout wires 130 in the direction z perpendicular to the light-exiting surface of the display panel, the first opening 120 is broken at the first fanout wires 130. To prevent the moisture efficiently, one first opening 121 can be arranged between every two adjacent second wires 121.

Figure 10:
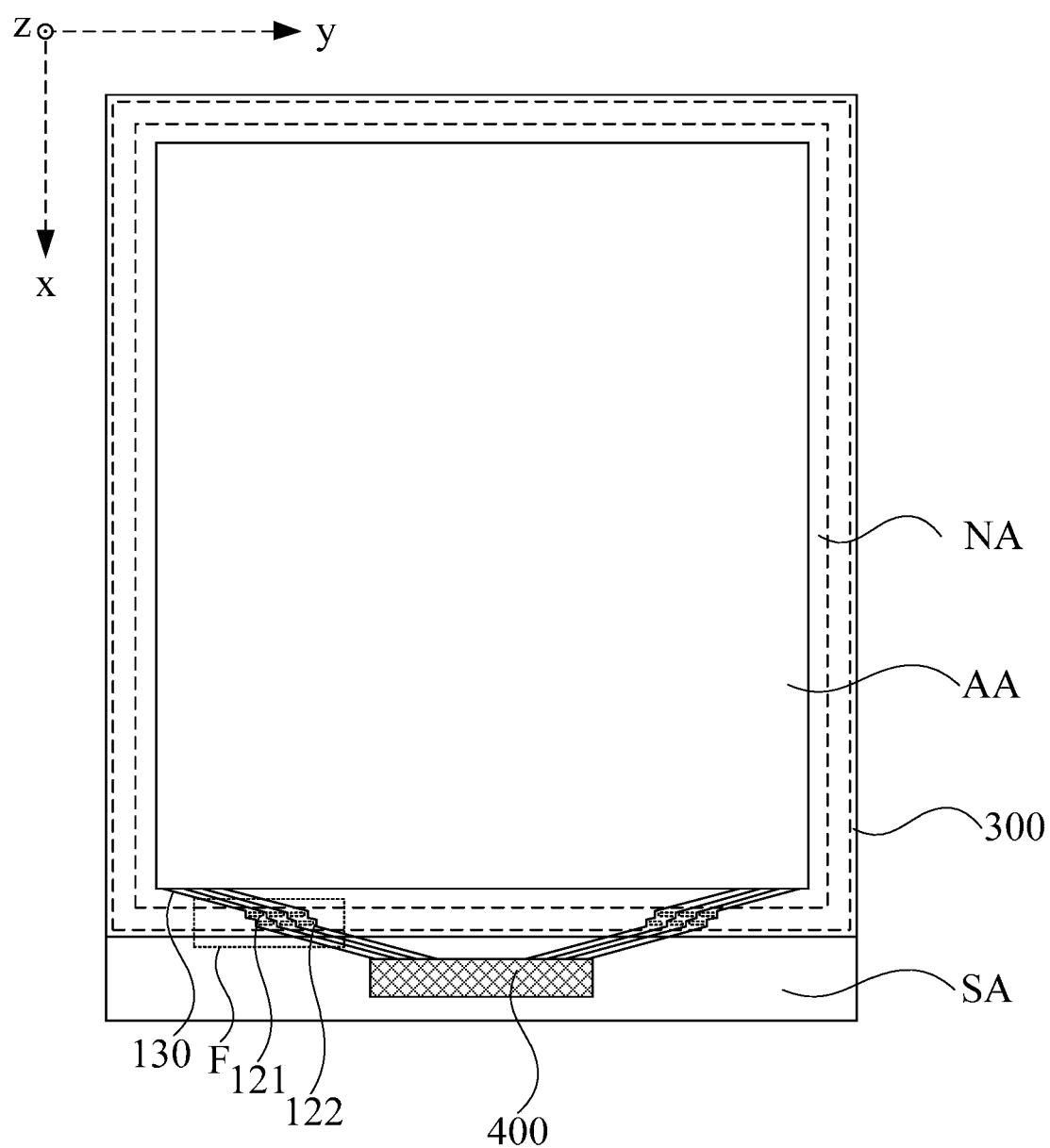
FIG. 10 is a top view of another display panel according to some embodiments of the present disclosure.
Figure 11:
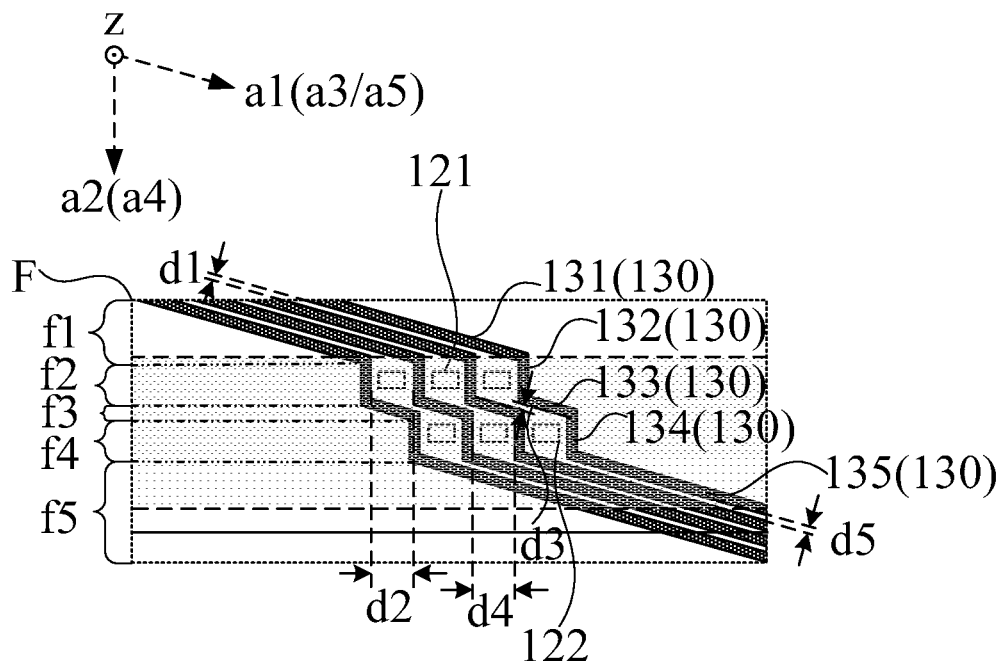
FIG. 11 is an enlarged view of an area in a dotted box F of the display panel in FIG. 10.

With respect to FIG. 10 and FIG. 11, FIG. 10 is a top view of another display panel according to some embodiments of the present disclosure, and FIG. 11 is an enlarged view of an area in a dotted box of the display panel in FIG. 10. In the following embodiments, same structures shown in FIGS. 5-9 are not repeated here and differences from FIGS. 5-9 lie in that each first fanout wire 130 includes a fourth wire 134 and a fifth wire 135, where two ends of the fourth wire 134 are connected to the third wire 133 and the fifth wire 135, respectively. The fourth wire 134 extends along a fourth direction a4, the fifth wire 135 extends along a fifth direction a5, the fourth direction a4 intersects with the third direction a3, and the fourth direction a4 intersects with the fifth direction a5. The fourth wires 134 are arranged in sequence to form a fourth wire area f4, the fifth wires 135 are arranged in sequence to form a fifth wire area f5, and the fourth wire area f4 is located between the third wire area f3 and the fifth wire area f5. A distance d4 between adjacent fourth wires 134 is greater than the distance d3 between adjacent third wires 133, and is also greater than a distance d5 between adjacent fifth wires 135. The planarization layer 120 is provided with a second opening 122, and in the direction z perpendicular to the light-exiting surface of the display panel, the second opening 122 overlaps with both the sealant 300 and the fourth wire area f4.

In some embodiments, the fourth direction a4 is parallel with the second direction a2 and the fifth direction a5 is parallel with the third direction a3, that is, an extending direction of the fourth wires 134 is the same as an extending direction of the second wires 132 and an extending direction of the fifth wires 135 is the same as an extending direction of the third wires, which facilitates manufacturing of the display panel.

In above embodiments, in order to prevent the moisture efficiently, the number of line segments of the polyline of the first fanout wire 130 is increased, thereby forming another sparse area (i.e., the fourth wire area f4) on basis of the second wire area f2. The second opening 122 is arranged in a part of the planarization layer 120 corresponding to the fourth wire area f4, and in the direction z perpendicular to the light-exiting surface of the display panel, the second opening 122 overlaps with the sealant 300. Such configuration has a similar principle of preventing the moisture with the first opening 121, which will not be repeated herein. Since the first opening 121 does not overlap with the first fanout wires 130 as shown in FIGS. 5-9, that is, the first opening 121 is broken at the first fanout wires 130, the second opening 122 as shown in FIG. 10 is provided in such a manner that in the second direction a2, the first opening 121 and the second opening 122 are staggered to with respect to each other, thereby blocking a path in which the moisture permeates into the display panel and thus efficiently preventing the moisture from permeating into the display panel.

The above embodiments are merely exemplarily and these embodiments illustrate the display panel with the fourth wires 134, the fifth wires 135 and the second opening 122 on the basis of embodiments shown in FIGS. 5-8. For example, these embodiments show the second opening 122 being of a block-shaped structure and not overlapping with the first fanout wires 130 in the direction z perpendicular to the light-exiting surface of the display panel. In some other embodiments of the present disclosure, the display panel is provided with the fourth wires 134, the fifth wires 135 and the second opening 122 on the basis of embodiments shown in FIGS. 1-4, and the second opening 122 is of a strip-shaped structure and overlaps with multiple second fanout wires 132 in the direction z perpendicular to the light-exiting surface of the display panel.

Figure 12:
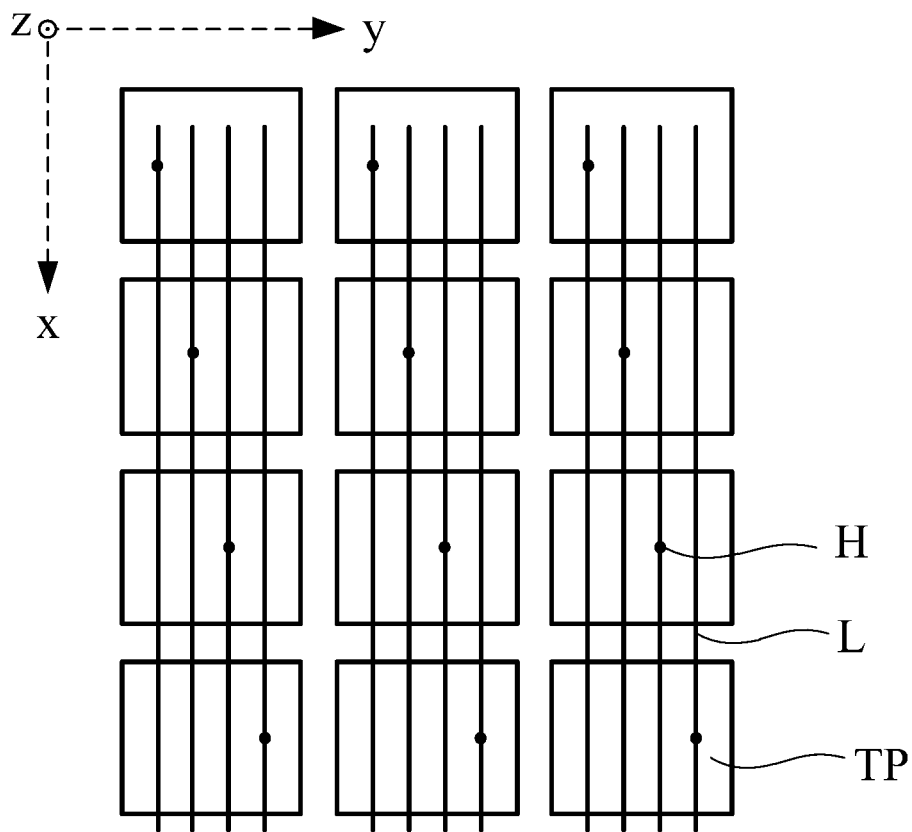
FIG. 12 is top view of a touch structure according to some embodiments of the present disclosure.
Figure 13:
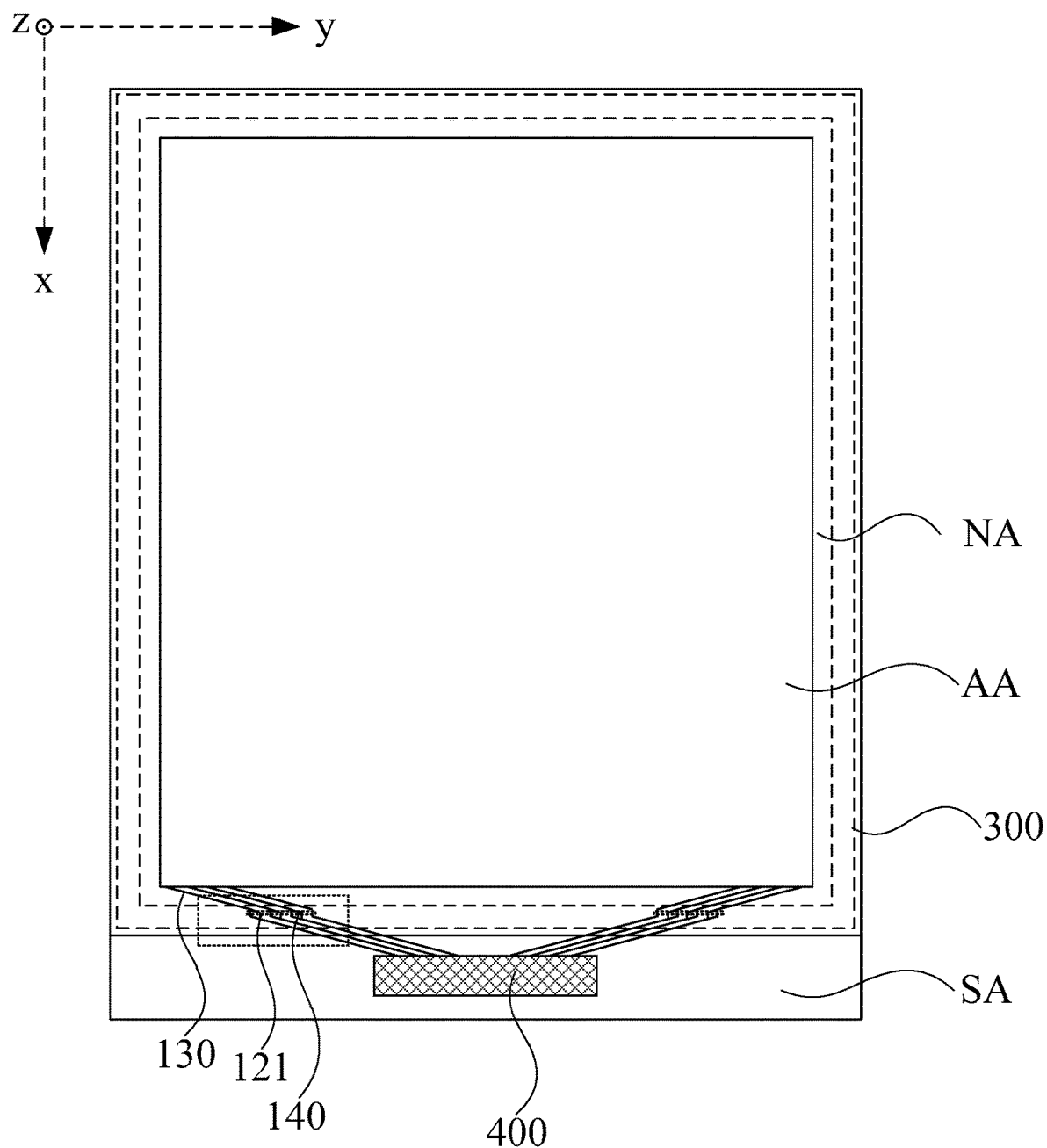
FIG. 13 is a top view of another display panel according to some embodiments of the present disclosure.

In some embodiments, the first fanout wire 130 of the display panel is arranged at a side of the planarization 120 facing away from the base substrate 110, e.g., the first fanout wire 130 is arranged on and directly contacts a surface of the planarization 120 facing away from the base substrate 110. The first fanout wire 130 is typically configured to connect a touch electrode integrated inside the display panel, as shown in FIG. 12. FIG. 12 is top view of a touch structure according to some embodiments of the present disclosure. In some embodiments, the touch structure includes a plurality of touch electrodes TP arranged in a m×n matrix, where m and n each are integers greater than 1, e.g., m=4 and n=3 as shown in FIG. 12. The touch electrodes TP are reused as common electrodes for displaying in a display stage, and they perform touch detection through self-capacitors during a touch stage. In some embodiments, each touch electrode TP electrically connects at least one touch electrode wire L through a via H, e.g., each touch electrode TP is connected to at least one touch electrode wire L, as shown in FIG. 12. The touch electrode wire L extends into the non-display area and is electrically connected to a driving chip (not shown in FIG. 12) through respective first fanout wires mentioned in above embodiments. The driving chip is configured to provide a touch scanning signal to the touch electrode TP and perform touch detection based on a touch detection signal detected and output by the touch electrode. The touch structure is not limited to the structure mentioned above.

Figure 14:
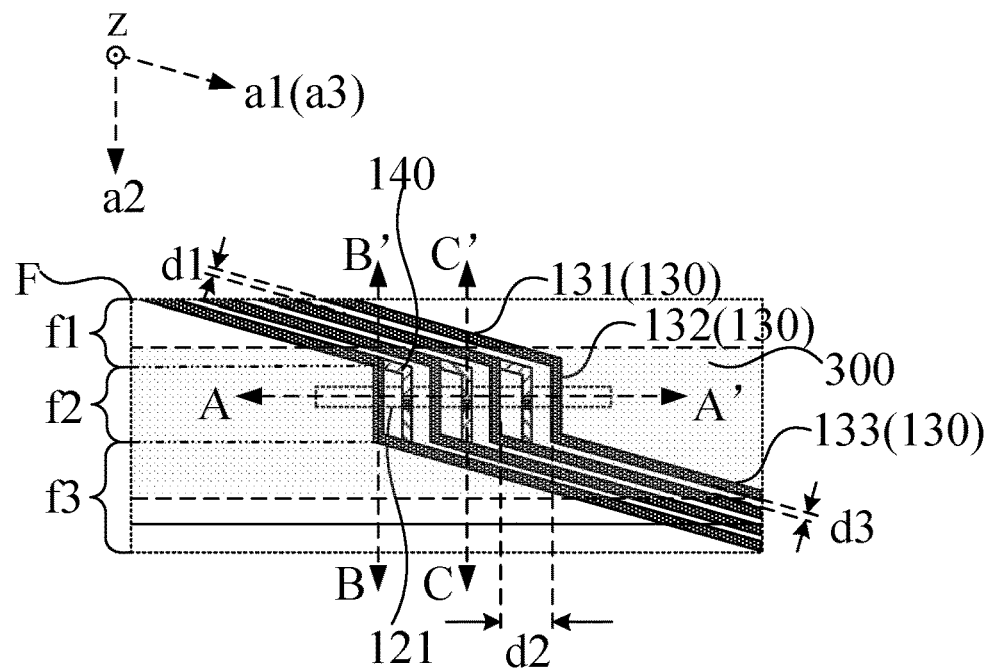
FIG. 14 is an enlarged view of an area in a dotted box F of the display panel in FIG. 13.
Figure 15:
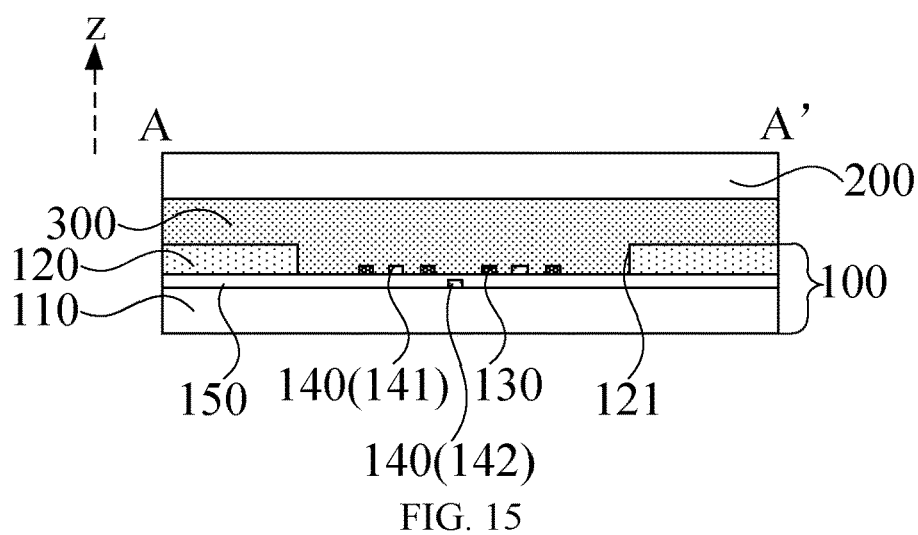
FIG. 15 is a sectional view of the display panel taken along line AA' in FIG. 14.
Figure 16:
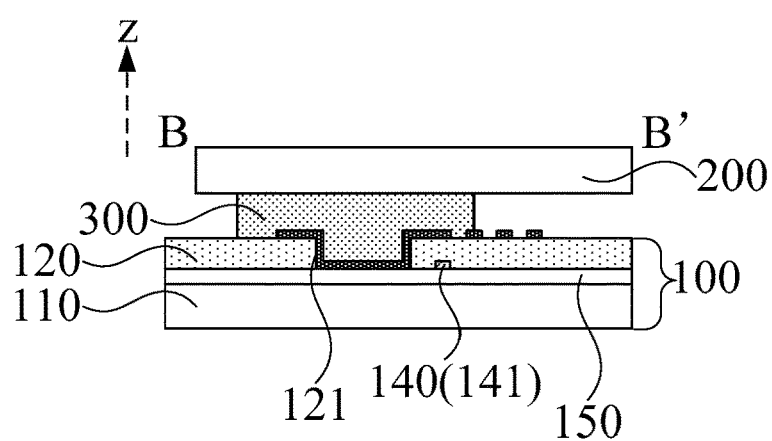
FIG. 16 is a sectional view of the display panel taken along line BB' in FIG. 14.
Figure 17:
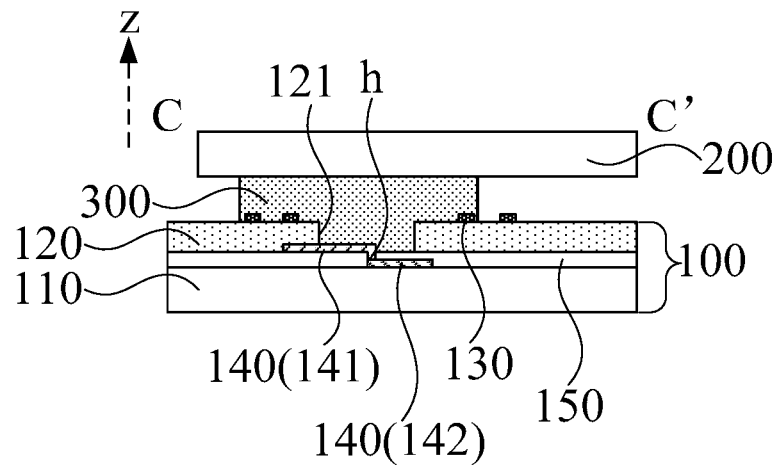
FIG. 17 is a sectional view of the display panel taken along line CC' in FIG. 14.

With respect to FIGS. 13-17, FIG. 13 is a top view of another display panel according to some embodiments of the present disclosure; FIG. 14 is an enlarged view of an area in a dotted box of the display panel in FIG. 13; FIG. 15 is a sectional view of the display panel taken along line AA' in FIG. 14; FIG. 16 is a sectional view of the display panel taken along line BB' in FIG. 14; and FIG. 17 is a sectional view of the display panel taken along line CC' in FIG. 14. In the following embodiments, same structures with FIGS. 1-4 are not repeated here and differences from FIGS. 1-4 lie in that the first substrate 100 further includes a plurality of second fanout wires 140 arranged at a side of the base substrate 110 close to the second substrate 200 and arranged at a side of the planarization layer 120 close to the base substrate 110. In the direction z perpendicular to the light-exiting surface of the display panel, the second fanout wires 140 at least partially overlap with the first fanout wires 130 to form an overlap region. The overlap region does not overlap with the first opening 121 in the direction z perpendicular to the light-exiting surface of the display panel.

The second fanout wire 140 is arranged at a side of the planarization layer 120 close to the base substrate 110, e.g., at least part of the second fanout wire 140 is arranged-at and contacts a surface of the planarization layer 120 close to the base substrate 110. Assuming that the first opening 121 overlaps with the overlap region, the first fanout wire would be in direct contact with the second fanout wire, thereby causing a short circuit. Thus, in the direction z perpendicular to the light-exiting surface of the display panel, the first opening 121 does not overlap with the overlap region. In some embodiments, as shown is FIGS. 13-17, the second fanout wire 140 is arranged in two layers and includes a first wire portion 141 and a second wire portion 142. The first wire portion 141 is arranged on and directly contacts a surface of the planarization 120 close to the base substrate 110. The second wire portion 142 is arranged at a side of the first wire portion 141 close to the base substrate 110. An insulating layer 150 is arranged between the first wire portion 141 and the second wire portion 142. The first wire portion 141 and the second wire portion 142 are electrically connected to each other through a via h. In some embodiments, in the direction z perpendicular to the light-exiting surface of the display panel, an overlap region in which the first fanout wire 130 overlaps with the first wire 140 and does not overlap with the first opening 121.

Figure 18:
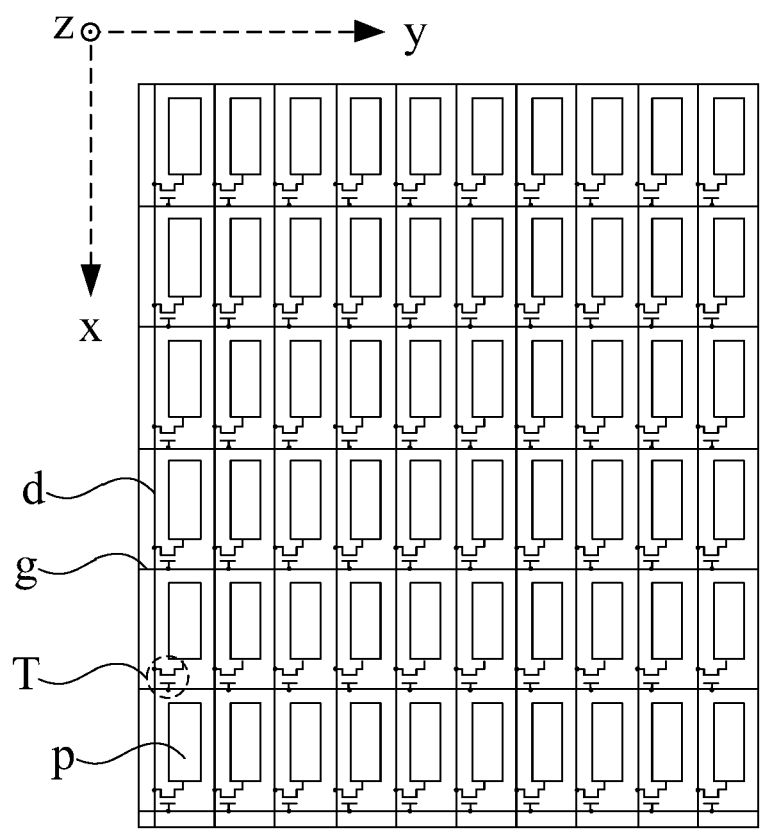
FIG. 18 is a top view of a display area according to some embodiments of the present disclosure.

In some embodiments, the first substrate 100 is an array substrate, and a liquid crystal layer is arranged between the first substrate 100 and the second substrate 200. FIG. 18 is a top view of a display area according to some embodiments of the present disclosure. In the display area, as shown in FIG. 18, the first substrate 100 includes a plurality of scanning lines g and a plurality of data lines d. The scanning lines extend along a direction y and are arranged along a direction x. The data lines d extend along the direction x and are arranged along the direction y. The scanning lines g are insulated from and intersect with the data lines d to define a plurality of sub-pixels. The direction x intersects with the direction y. The sub-pixel includes a pixel electrode p arranged on the first substrate 100, a common electrode (not shown in FIG. 18) and a thin film transistor T. During a display stage of the display panel, under control of a corresponding scanning line g, a data line corresponding to a source of the thin film transistor T charges and discharges a pixel electrode p connecting to a drain of the thin film transistor T through the thin film transistor T. Thus, a parallel field is formed between the pixel electrode p and the common electrode to drive liquid crystals to rotate, thereby achieving a display function. In some embodiments, the direction x is parallel with the second direction a2. In some other embodiments, the direction x is not parallel with the second direction a2.

In some embodiments, as shown in FIGS. 13-18, the second fanout wires 140 are configured to connect the data lines with the driving chip 400, that is, the driving chip 400 transmits display data signals to the data lines through the second fanout wires 140. In some embodiments, the first wire portion 141 is made in the same layer with the data lines d through the same process, and the second wire portion 142 is made in the same layer with the scanning lines d through the same process.

In some embodiments, the display panel and the display area each have regular rectangular shapes. In some other embodiments, the display panel and the display area each have irregular shapes. For example, four corners of the display area each are arc, or four corners of the display panel each are arc. In some embodiments, a width of a bezel of the display panel of an irregular shape is shortened. The configuration of the display panel in embodiments of the present disclosure facilitates shortening the width of the bezel, thereby increasing a screen-to-body ratio.

The number of the first fanout wires 130 and the second fanout wires 140 in the present disclosure are exemplarily illustrated and the present disclosure is not limited thereto. More first fanout wires 130 and the second fanout wires 140 can be provided in the display panel.

Figure 19:
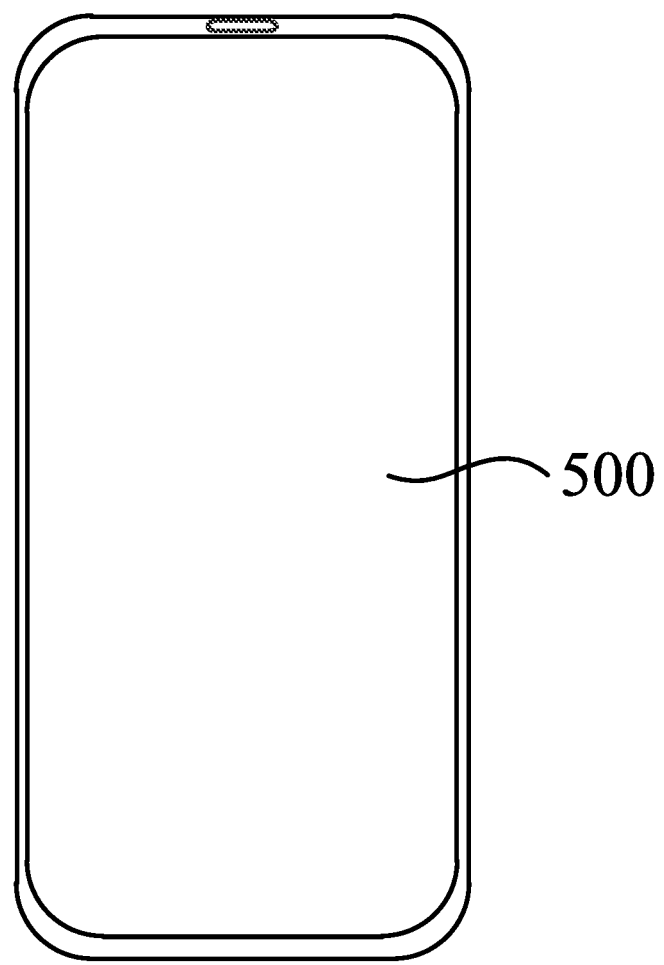
FIG. 19 is a schematic diagram of a display device according to some embodiments of the present disclosure.

Some embodiments of the present disclosure further provide a display device. FIG. 19 is a schematic diagram of a display device according to some embodiments of the present disclosure. Referring to FIG. 19, the display device can include any one of the display panel mentioned in above embodiments. In some other embodiments, the display device can further include a backlight module (not shown in FIG. 19) and so on. In some embodiments, the display device can be a cellphone or a device with a display function, such as a tablet computer, a laptop, a display and so on.

While the preferred embodiments of the present disclosure have been described above, the scope of the present disclosure is not limited thereto. Various modifications, equivalent alternatives or improvements can be made by those skilled in the art without departing from the scope of the present disclosure. These modifications, equivalent alternatives and improvements are to be encompassed by the scope of the present disclosure.

What is claimed is:

1. A display panel having a display area and a non-display area surrounding the display area, the display panel comprising:
   a first substrate and a second substrate that are opposite to each other, the first substrate comprising a base substrate, a plurality of first fanout wires and a planarization layer, wherein the plurality of first fanout wires and the planarization layer are arranged at a side of the base substrate proximate to the second substrate, and the plurality of first fanout wires is arranged in the non-display area and at a side of the planarization layer facing away from the base substrate; and
   a sealant arranged in the non-display area, wherein the first substrate and the second substrate are attached together through the sealant, and in a direction perpendicular to a light-exiting surface of the display panel, wherein the sealant overlaps with the plurality of first fanout wires,
   wherein the plurality of first fanout wires comprises a plurality of first wires, a plurality of second wires and a plurality of third wires, and one of the plurality of first wires, one of the plurality of second wires and one of the plurality of third wires are connected in sequence that forms at least a part of one of the plurality of first fanout wires; wherein each of the plurality of first wires extends along a first direction, each of the plurality of second wires extends along a second direction, each of the plurality of third wires extends along a third direction, wherein the first direction intersects with the second direction, and wherein the second direction intersects with the third direction;
   wherein the plurality of first wires is arranged in sequence that forms a first wire area, the plurality of second wires is arranged in sequence that forms a second wire area, the plurality of third wires is arranged in sequence that forms a third wire area, and the second wire area is located between the first wire area and the third wire area;
   wherein a distance between adjacent second wires of the plurality of second wires is greater than a distance between adjacent first wires of the plurality of first wires, and is greater than a distance between adjacent third wires of the plurality of third wires; and
   wherein the planarization layer is provided with a first opening, wherein, in the direction perpendicular to the light-exiting surface of the display panel, the first opening overlaps with each of the sealant and the second wire area.

2. The display panel according to claim 1, wherein the first direction is parallel with the third direction.

3. The display panel according to claim 1, wherein the first opening has a strip-shaped structure.

4. The display panel according to claim 3, wherein the first opening extends along a direction parallel to that of a direction in which the plurality of second wires is arranged.

5. The display panel according to claim 1, wherein the first opening is of a block-shaped structure, and wherein, in the direction perpendicular to the light-exiting surface of the display panel, the first opening does not overlap with the plurality of first fanout wires.

6. The display panel according to claim 5, wherein the first opening is arranged between every two adjacent second wires of the plurality of second wires.

7. The display panel according to claim 1, wherein the plurality of first fanout wires further comprises a plurality of fourth wires and a plurality of fifth wires, each of the plurality of first fanout wires further comprises one of the plurality of fourth wires and one of the plurality of fifth wires, each of the plurality of fourth wires has two ends respectively connected to a corresponding one of the plurality of third wires and a corresponding one of the plurality of fifth wires, each of the plurality of fourth wires extends along a fourth direction, each of the plurality of fifth wires extends along a fifth direction, the fourth direction intersects with the third direction, and the fourth direction intersects with the fifth direction;
   wherein the plurality of fourth wires is arranged in sequence that forms a fourth wire area, the plurality of fifth wires is arranged in sequence that forms a fifth wire area, and the fourth wire area is located between the third wire area and the fifth wire area;
   wherein a distance between adjacent fourth wires of the plurality of fourth wires is greater than the distance between adjacent third wires of the plurality of third wires, and is greater than a distance between adjacent fifth wires of the plurality of fifth wires; and
   wherein the planarization layer is provided with a second opening, and in the direction perpendicular to the light-exiting surface of the display panel, and the second opening overlaps with both the sealant and the fourth wire area.

8. The display panel according to claim 7, wherein the fourth direction is parallel with the second direction, and the fifth direction is parallel with the third direction.

9. The display panel according to claim 1, wherein the first substrate further comprises a plurality of second fanout wires arranged at the side of the base substrate proximate to the second substrate and at a side of the planarization layer proximate to the base substrate;
   wherein, in the direction perpendicular to the light-exiting surface of the display panel, at least one of the plurality of second fanout wires overlaps with at least one of the plurality of first fanout wires that forms an overlap region; and wherein in the direction perpendicular to the light-exiting surface of the display panel, the first opening does not overlap with the overlap region.

10. A display device, comprising a display panel, the display panel having a display area and a non-display area surrounding the display area, the display panel comprising:

a first substrate and a second substrate that are opposite to each other, the first substrate comprising a base substrate, a plurality of first fanout wires and a planarization layer, wherein the plurality of first fanout wires and the planarization layer are arranged at a side of the base substrate proximate to the second substrate, and the plurality of first fanout wires is arranged in the non-display area and at a side of the planarization layer facing away from the base substrate; and a sealant arranged in the non-display area, wherein the first substrate and the second substrate are attached together through the sealant, and in a direction perpendicular to a light-exiting surface of the display panel, the sealant overlaps with the plurality of first fanout wires, wherein the plurality of first fanout wires comprises a plurality of first wires, a plurality of second wires and a plurality of third wires, and one of the plurality of first wires, one of the plurality of second wires and one of the plurality of third wires are connected in sequence that forms at least a part of one of the plurality of first fanout wires; each of the plurality of first wires extends along a first direction, each of the plurality of second wires extends along a second direction, each of the plurality of third wires extends along a third direction, the first direction intersects with the second direction, and the second direction intersects with the third direction;

wherein the plurality of first wires is arranged in sequence that forms a first wire area, the plurality of second wires is arranged in sequence that forms a second wire area, the plurality of third wires is arranged in sequence that forms a third wire area, and the second wire area is located between the first wire area and the third wire area;

wherein a distance between adjacent second wires of the plurality of second wires is greater than a distance between adjacent first wires of the plurality of first wires, and is greater than a distance between adjacent third wires of the plurality of third wires; and wherein the planarization layer is provided with a first opening, wherein, in the direction perpendicular to the light-exiting surface of the display panel, the first opening overlaps with each of the sealant and the second wire area.

11. The display device according to claim 10, wherein the first direction is parallel with the third direction.

12. The display device according to claim 10, wherein the first opening is of a strip-shaped structure.

13. The display device according to claim 12, wherein the first opening extends along a direction parallel with a direction in which the plurality of second wires is arranged.

14. The display device according to claim 10, wherein the first opening is of a block-shaped structure, and wherein in the direction perpendicular to the light-exiting surface of the display panel the first opening does not overlap with the plurality of first fanout wires.

15. The display device according to claim 14, wherein the first opening is arranged between every two adjacent second wires of the plurality of second wires.

16. The display device according to claim 10, wherein the plurality of first fanout wires further comprises a plurality of fourth wires and a plurality of fifth wires, each of the plurality of first fanout wires further comprises one of the plurality of fourth wires and one of the plurality of fifth wires, each of the plurality of fourth wires has two ends respectively connected to a corresponding one of the plurality of third wires and a corresponding one of the plurality of fifth wires, each of the plurality of fourth wires extends along a fourth direction, each of the plurality of fifth wires extends along a fifth direction, the fourth direction intersects with the third direction, and the fourth direction intersects with the fifth direction;

wherein the plurality of fourth wires is arranged in sequence that forms a fourth wire area, the plurality of fifth wires is arranged in sequence that forms a fifth wire area, and the fourth wire area is located between the third wire area and the fifth wire area;

wherein a distance between adjacent fourth wires of the plurality of fourth wires is greater than the distance between adjacent third wires of the plurality of third wires, and is greater than a distance between adjacent fifth wires of the plurality of fifth wires; and wherein the planarization layer is provided with a second opening, and in the direction perpendicular to the light-exiting surface of the display panel, the second opening overlaps with both the sealant and the fourth wire area.

17. The display device according to claim 16, the fourth direction is parallel with the second direction, and the fifth direction is parallel with the third direction.

18. The display device according to claim 10, wherein the first substrate further comprises a plurality of second fanout wires arranged at the side of the base substrate proximate to the second substrate and at a side of the planarization layer proximate to the base substrate;

wherein in the direction perpendicular to the light-exiting surface of the display panel, at least one of the plurality of second fanout wires overlaps with at least one of the plurality of first fanout wires that forms an overlap region; and wherein in the direction perpendicular to the light-exiting surface of the display panel, the first opening does not overlap with the overlap region.

* * * * *